Patented Oct. 10, 1939

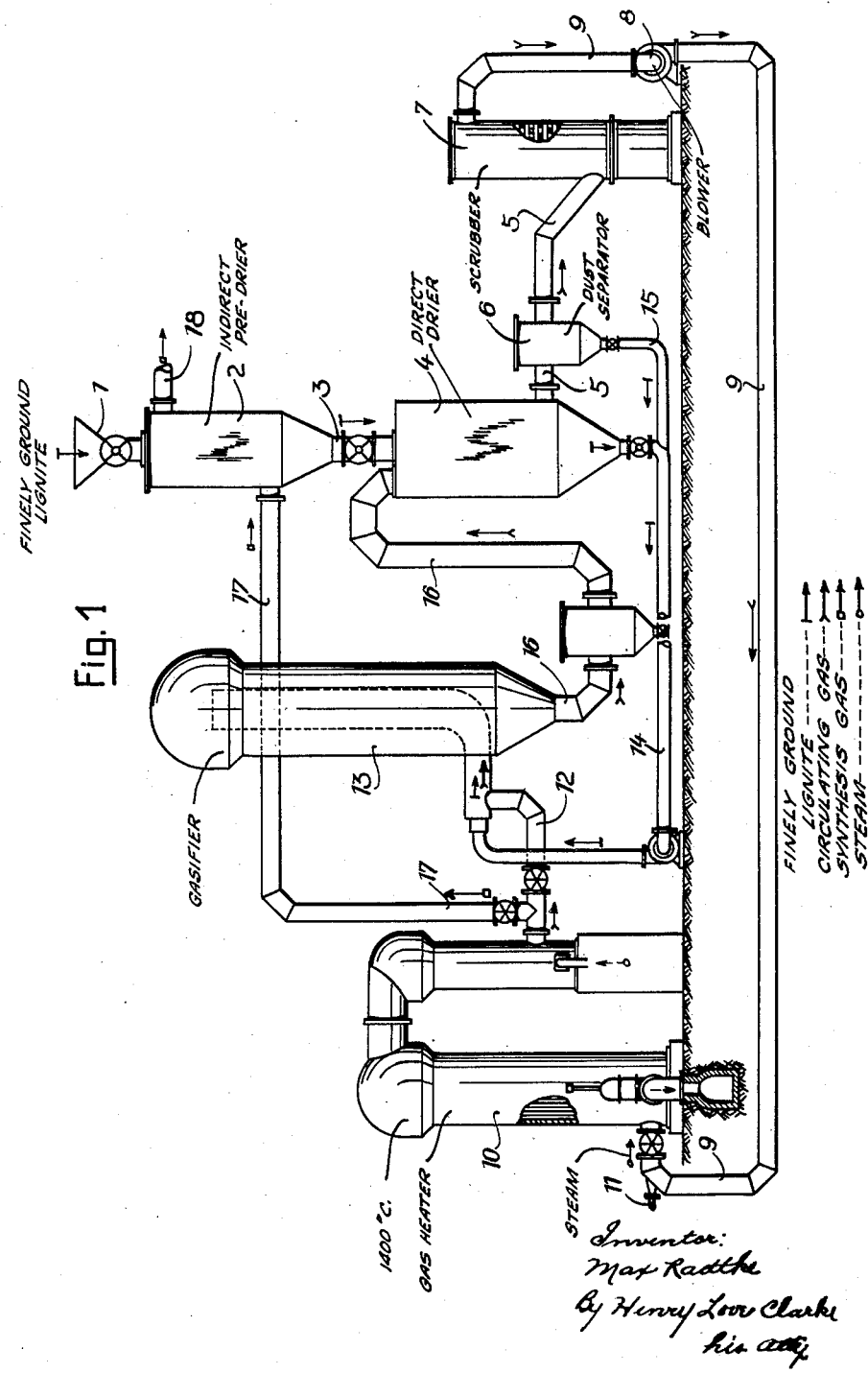

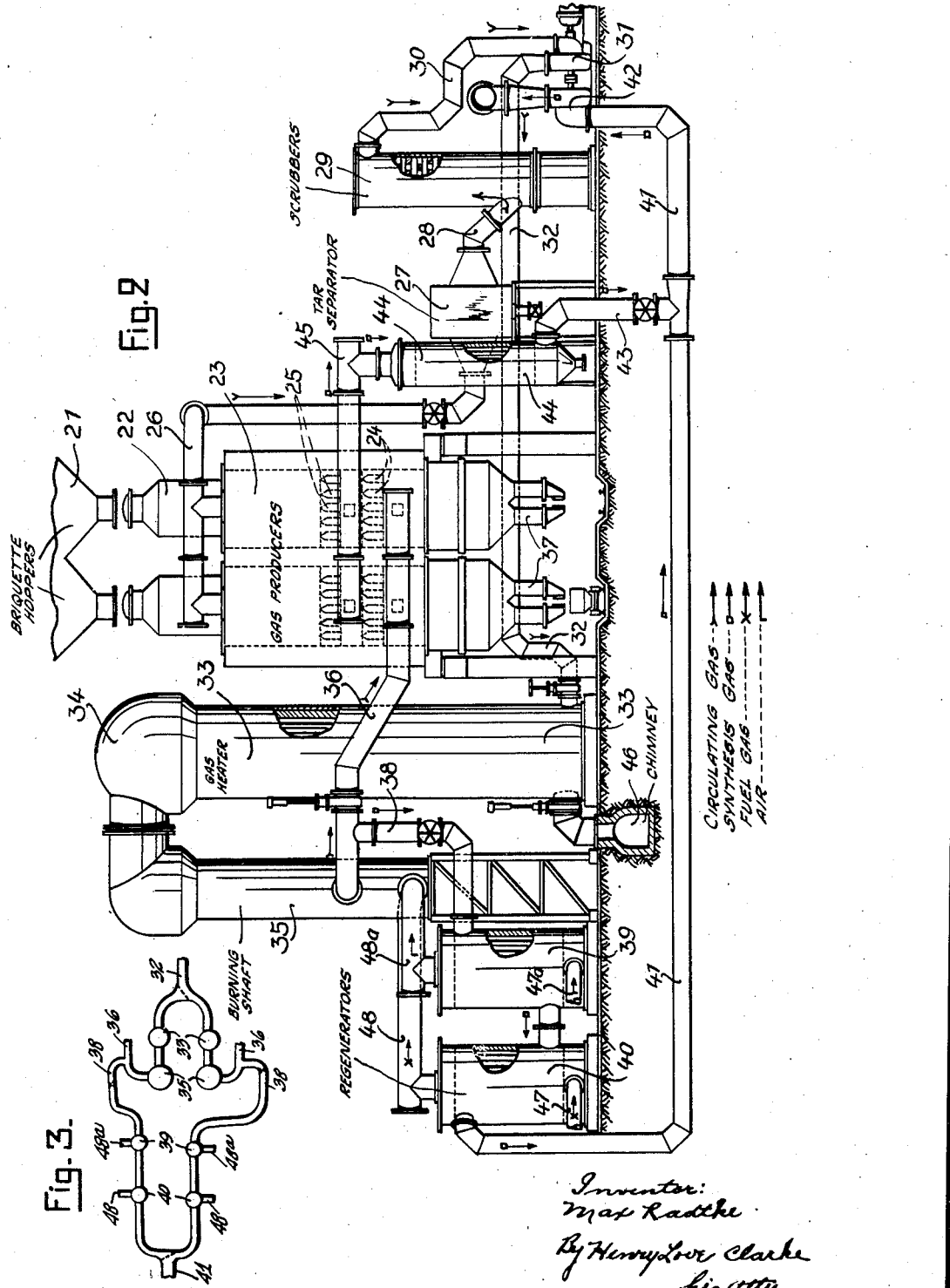

2,175,613

UNITED STATES PATENT OFFICE 2,175,613

PROCESS FOR THE PRODUCTION OF GASES

Max Radtke, Essen, Germany, assignor, by mesne assignments, to Koppers Company, Pittsburgh, Pa., a corporation of Delaware Application March 11, 1937, Serial No. 130,354
In Germany March 10, 1936

3 Claims. (Cl. 48—202)

The present invention relates to the continuous production of gases containing carbon monoxide and hydrogen and which are formed at an increased temperature by treating solid fuels, such as coke, coal, lignite, shale, peat, etc., with steam (water-gas process), and in particular to the production of those gases, which are free from unconverted hydrocarbons, so that the gases can be used for the synthesis of hydrocarbons, for use such as for motor fuels, or lubricants, or for other purposes.

It is well known that solid fuels can be gasified by being brought into contact with a highly heated mixture consisting of steam and a gas serving as a heat transferring medium. A portion of the gas produced can be used as the heat transferring medium. If the gas-steam mixture is continuously passed in a cycle through the gas produced, in which is situated the fuel to be gasified, and through a heater, in communication with the gas producer, a certain quantity of gas can be drawn off continuously to be used for the synthesis purpose in question.

An object of my invention is to improve this process for continuous production of gas, water-gas, in such a way, that the gas produced is free from any unconverted hydrocarbons, especially from tarry constituents, which separate from the gas later on and thus plug up the pipelines, apparatus or contact substances.

The continuous gasification of a solid fuel can be carried out with a highly heated mixture consisting of steam and gas as a gaseous heat carrier in a different way. If a fuel is to be dealt with, the individual parts of which are of a considerable size, such as lump coke or lump coal, briquetted coal or the like, the fuel is placed in a gas producer arranged like a shaft furnace. The hot gas-steam mixture is admitted at the bottom and useful gases may be discharged at a suitable place of the gas producer, above the hot gas inlet. In case the gas exit is arranged at the correct height above the inlet of the hot gas-steam mixture, i. e., in a zone of the gas producer where exists a high temperature, then the useful gas flowing-off is nearly free from unconverted hydrocarbons. Alterations in the operating conditions of the gas producer, resulting in a different distribution of temperature within the gas producer charge, may cause the temperature of the fuel at the gas outlet or above the gas outlet to be too low, so that tarry constituents originating from the bitumen of the fuel will enter the useful gas, instead of being discharged from the gas producer together with the circulated gas. It is obvious, that this danger is greater, the more tarry constituents (bituminous) are contained in the fuel. The production of tar-free gases from bituminous fuels offers, therefore, considerable difficulties, which hitherto could not be overcome to the fullest satisfaction.

These difficulties are especially troublesome, when a finely divided fuel for instance in the form of dust, is to be treated. It is possible to produce from a dust-like fuel, such as finely ground pit- or brown coal, water-gas or other gases by means of highly heated mixtures of steam and gas as a heat carrying gas. For this purpose, the fuel has been, for instance, charged into a high tower or the like, in which it is allowed to sink down gradually, whilst a highly heated mixture of gas and steam flows upwards through the tower. The reaction gas, enriched with dust, is discharged at the top of the tower and delivered to a suitable apparatus for the precipitation of dust. It is, however, not possible to discharge a tar-free gas from any suitable point of the tower, since due to the very small size of particles, the distillation, i. e., the expelling of tarry constituents and the gasification takes place practically simultaneously, so that a separate discharge of the products made is rendered impossible.

Principally, my invention now provides for the discharge of the useful gas from the system from the heater of the gas producing system, or at another place in the system between the gas heater and the gas producer holding the fuel, and for operation of the gas heater at such a high temperature, that the hydrocarbons entering the same are decomposed by conversion with steam present, if necessary.

Furthermore, my invention comprises the utilization of the heat contained in the gases being drawn-off from the gas producing system at a comparatively high temperature. For this purpose, I conduct the useful gases, leaving the heater at a high temperature, through regenerators which are to serve in a next operating period for heating-up the combustion media, by means of which the gas heater is to be warmed up for storing heat to heat the circulating gas-steam mixture.

Another important feature of my invention is the drawing-off of the useful gas either from the gas producer at a suitable point, at which the water-gas reaction begins to become slower, or from the circulating gas stream, after its heating-up, in both of which cases the quantity of useful gas discharged from the gas producer or from the heated circulating gas stream, is regulable in such a way that a certain temperature within the gas producer can be maintained. In order that my invention is more readily understood and carried into practice, reference is hereby made to the accompanying drawings, showing apparatus for carrying out the process according to the invention.

Figure 1 illustrates a plant for treating dust-like coal in accordance with the process of my invention.

Figure 2 shows a plant for the gasification of dust-like fuels, for instance, briquettes, according to the invention.

Figure 3 is a diagrammatic illustration of two gas heaters 33 and their systems.

In the plant illustrated in Figure 1 of the drawings, the fuel to be treated, for instance, finely ground lignite, is delivered through the feeding pipeline 1 into indirect heat exchanger 2, in which it is subjected to a heat treatment, for instance, to a pre-drying, by indirect heat exchange with hot gases, the origin of which is explained in the following. The crude brown coal is delivered from the pre-drier 2 through the pipeline 3 into a direct heat drier 4, but by which it is further treated in direct contact with the hot gases. The crude brown coal is dried in the apparatus 4 and partially freed from carbon dioxide and certain hydrocarbons.

The hot gases introduced into the apparatus 4 together with the vapours developed therein from the crude brown coal as well as the $CO_2$ gases leave the apparatus 4 through the pipeline 5, entering the dust separator 6, where the fine particles of fuel withdrawn with the gas are eliminated from the gas-steam mixture. The dust is completely removed from the gas-steam mixture in the scrubber 7, for instance, by washing with water, whereby simultaneously the temperature of the gas-steam mixture is reduced to such an extent, that it can be moved economically by means of the blower 8. The blower 8 is connected by means of pipeline 9 with the gas heater 10, which is arranged similar to a regenerator. Said heater 10 is suitably warmed up in a preceding operating period by the combustion of gas and air to such a degree, that the temperature in the upper part of the heater 10 is brought to about 1400° C. The heater 10 is, for instance, filled with refractory checkerwork and serves as a heat exchanger. The comparatively cold gas-steam mixture admitted from below into the heater 10 are heated by the checkerwork of the heater 10, so that the temperature in the upper part of the heater 10 is about 1400° C.

At the foot of the heater 10 is provided a pipeline 11 through which steam can be added, if necessary, to the steam-gas mixture, arriving through the pipeline 9.

A pipeline 12 leads from the upper end of the heater 10 into the gasifier 13, which suitably is constructed similar to a tower. The coal dried in the apparatus 4 is introduced into the lower part of the gasifier 13, through the pipeline 14. The pipeline 14 is connected by means of a pipeline 15 with the dust separator 6, in order to be able to add the dry dust coal, precipitated in the dust separator, to the gasification process, if required.

The highly heated steam-gas mixture is now converted in the apparatus 13 by reaction with the finely distributed coal with the formation of water-gas. Thereby the crude brown coal is simultaneously distilled at the low temperature. A part of the hydrocarbons resulting from the distillation process is immediately converted by reaction with the steam present in the gasifier 13 into hydrogen and carbon monoxide. Since, however, the temperature in the gasifier 13 drops very suddenly, a considerable amount of hydrocarbons is left unconverted. This proportion of unconverted hydrocarbons is still too great to provide a gas, leaving the gasifier 13, immediately available for the synthesis.

The invention now provides for the essential improvements by which this residue of unconverted hydrocarbons is first of all passed again through the heater 10, in which the hydrocarbons are completely converted with steam into hydrogen and carbon monoxide. The whole quantity of reaction products in the form of gas and vapours leaves the gasifier 13 through the pipeline 16, which leads to the drying apparatus 4 or to another gas cooling arrangement. The raw coal is, therefore, brought in direct contact with the highly heated circulating gases within the drying apparatus 4 and these gases transfer their heat to the solid fuels, being very useful for the process.

The final end product gas to be treated in the synthesis plant is taken from the connection between the heater 10 and gasifier 13 through the pipeline 17. The gas stream has attained at this point practically its highest temperature, so that the hydrocarbons contained in the gas are practically converted nearly completely, with the steam present, forming at the same time hydrogen and carbon monoxide. The gas to be drawn off through the pipeline 17 has thus reached an extraordinarily low percentage of methane and hydrocarbons, which hardly exceeds 0.2%.

The high valuable synthesis gas, leaving the pipeline 17, now transfers a portion of its heat to the raw brown coal in the indirect heat exchanger 2 and finally leaves the system through the pipeline 18.

If necessary, the process according to my invention may also be carried out in such a way, that the reaction steam to be added through the pipeline 11 is heated in a special heater, independent from the circulating gas and is directly led from this heater into the gasifier 13. This change is possible, if the gas stream arriving through the pipeline 9 already contains a sufficient quantity of steam, so that the hydrocarbons can be fully converted within the gas heater 10.

In the gas producing plant shown in Figure 2, of the drawings, the fuel to be treated, for instance, briquette, is filled into the gas producer 23 from the bunker 21 through the charging device 22. The gas producer 23 is suitably formed by refractory brickwork.

Quite a number of openings 24 are provided at the bottom of the water-gas reaction zone of the gas producer, through which a highly heated mixture consisting of reaction gas and steam, the so-called circulating gas, is blown in. Above the openings 24, a multitude of openings 25 are provided in the walls of the gas producer shaft. The synthesis gas to be drawn off from the gas producer 23 is led off through these openings 25. From the roof of the gas producer 23, extends the pipeline 26, which leads to a tar separator 27. The distilling gas driven off from the bituminous fuel in the upper part of the gas producer 23, together with a certain quantity of water-gas, is removed through the pipeline 26. After the tarry constituents, in suspension in the gas, have been separated in the tar separator 27 from the gas driven off through the pipeline 26, the gas is delivered through the pipeline 28 into a scrubber 29, from which a pipeline 30 leads to a blower 31. The blower 31 is in connection by means of the pipeline 32, with two gas heaters 33, diagrammatically illustrated in Fig. 3, being arranged similar to a Cowper stove, of which only one gas heater has been shown in side elevation on the drawings, for simplicity's sake. A burning shaft 35 is connected to the dome 34 of the gas heater 33. The lower end of the shaft 35 is in connection by means of a pipeline 36, with the inlets 24 of the gas producer 23, for the highly heated circulating gases.

The residue formed during the gasification process in the gas producer 23 is removed by the extractor 37.

From the pipe line 36 is branched-off the pipe line 38, which is coupled to the regenerators 39 and 40, connected behind and which are also connected to a gas exhauster 42, by means of pipeline 41. The pipeline 43 is likewise connected to the pipeline 41. During the heating period of the heaters 33, the fuel gas is led through the pipeline 47 into the regenerator 40, and is then delivered through the pipeline 48 into the burning shaft 35. The air flows through the pipeline 41a, regenerator 39 and pipeline 48a into the burning shaft 35. The pipeline 43 leads from a steam boiler 44 or from another suitable heat exchanger, which on the other hand is in connection with the gas outlets 25 of the gas producer 23, by means of the pipeline 45.

The method of carrying out the process according to my invention is about as follows:

The heat necessary for the formation of water-gas in the gas producer 23 is transferred onto the fuel by the highly heated circulating gas of the heater 33 as a heat carrier. The circulating gas consists of a mixture of water-gas and hydrocarbons, which escape during the gasification process of the bituminous fuels. The hydrocarbons with the steam which, if necessary, may flow wholly or partially also from a special steam source, are converted in the gas heater 33 with the formation of hydrogen and carbon monoxide, so that the reaction gas in the dome of the heater is practically free from hydrocarbons. A part of the reaction gas now flows through pipeline 38 to both the regenerators 39 and 40 and gives its heat to the refractory checkerwork. Another group of regenerators, shown diagrammatically in Fig. 3, but not shown in side elevation on the drawing, serves during this operating period to preheat the combustion media for the other gas heater 33 of the plant. The sensible heat of the hot gas is thereby advantageously utilized in order to bring the gas heater to a high temperature. It is also possible to arrange a further heat exchanger, arranged similar to a steam producer, or the like, in front or behind the regenerator, which depends upon the degree of temperature to be maintained in the regenerators 39 and 40. The gas and air are burnt in the burning shaft 35. The hot gases flow upwards therein and thence downwardly through the gas heater 33 and are discharged at the bottom of the heater into the chimney 46.

Such a quantity of fuel is removed from the process by means of the extractor device 37, that only a limited quantity of water-gas is formed in the gas producer. The quantity of water-gas is so controlled, that the water-gas together with the conversion gas made after the conversion of the distilling gases give a gas mixture, in which the content of hydrogen and carbon monoxide corresponds to the demands required of the gas for synthesis.

The quantity of water-gas taken from the gas producer 23 through the pipeline 45 is always such that, in proportion to the withdrawal of fuel, or to the rate of movement of the fuel within the gas producer, the gasifying zone is formed sufficiently high, so that the hydrocarbons formed in the low-temperature distillation of the fuel cannot be discharged into the openings 25. The pipelines 43 and 41 are, moreover, governed by a suitable regulating device, so that the quantity of the gases withdrawn through the pipelines can be exactly regulated.

If the process is carried out according to the present invention, any bituminous fuels may be treated, especially brown coal or similar reactive fuels. The process is further of special advantage for the gasification of brown coal lumps, for instance briquettes.

I have now described my present invention on the lines of a preferred embodiment thereof, but my invention is not limited in all its aspects to the mode of carrying out as described and shown, since the invention may be variously embodied within the scope of the following claims.

I claim:

1. In a process for the continuous production, from distillable bituminous fuel, of water-gas practically free from hydrocarbons for subsequent synthesis to hydrocarbons for motor fuel, which process involves circulating a gaseous heat carrier comprising a highly heated water-gas and steam mixture in cycle through a gasification step, in which the distillable fuel is both distilled by the heat of the gaseous heat carrier to liberate hydrocarbons from the fuel and is also reacted with the steam in the heat carrier to form water-gas, and thence from the gasification step to and through a reheating step for the carrier, in which the liberated hydrocarbons in the carrier from the gasification step are reacted to water gas and the carrier also reheated for return to the gasification step; the improvement comprising, flowing water-gas newly generated in each cycle of flow of the carrier through the gasification step also along to the reheating step together with the heat carrier and with the hydrocarbons distilled off in gasification step during their return to the reheating step for conversion of the hydrocarbons to water-gas and reheating of the carrier, and withdrawing the final end product water-gas from the process from the reheated carrier after it has been reheated in the reheating step and before the reheated heat carrier reenters the gasification step.

2. A process as claimed in claim 1, and in which the fuel is distilled and gasified in the gasification step in the form of finely divided fuel in suspension in the heat carrier medium, and in which the spent heat carrier medium, after discharge from the gasification step but before return to the reheating step, is brought into direct heat exchange relation with the finely divided fuel to be gasified, prior to its introduction to the gasification step, to dry the same and drive off $CO_2$ therefrom, and in which the sensible heat of the drawn off hydrocarbon free final end product water gas is utilized to preheat the fuel to be gasified prior to its introduction into the drying step by indirect heat exchange of the drawn off water gas with the fuel.

3. A process as claimed in claim 1, and in which the fuel in the gasification step is in the form of a mass of gradually descending fuel, and in which the distillation of the fuel is effected in the upper part of the mass and the water-gas reaction is effected in the lower part of the mass in the gasification step, and in which the heat carrier medium enters the mass in the gasification step below the water-gas reaction zone and flows upwardly through the same to and through the distillation zone and out of the mass at the upper part of the latter and in which the reheating step comprises two reheating zones operable in alternation with each other for concurrent storing of heat for and impartation of heat to the circulating gaseous heat carrier medium, and in which the sensible heat of the drawn off hydrocarbon free final end product water gas is utilized to preheat the heating medium for storing heat in the reheating zones, and in which a portion of the water gas generated in each cycle in the gasification step is also removed from the process directly from the gasification step at a point between the water gas reacting zone and the distillation zone and such portion combined with the portion of water gas withdrawn from the circulating gas stream that is withdrawn after the heating step but before the gasification step.

MAX RADTKE.